April 24, 1962  T. H. BLAU ET AL  3,030,944
SPIRAL AFTER-EFFECT APPARATUS
Filed Aug. 28, 1958  3 Sheets-Sheet 1
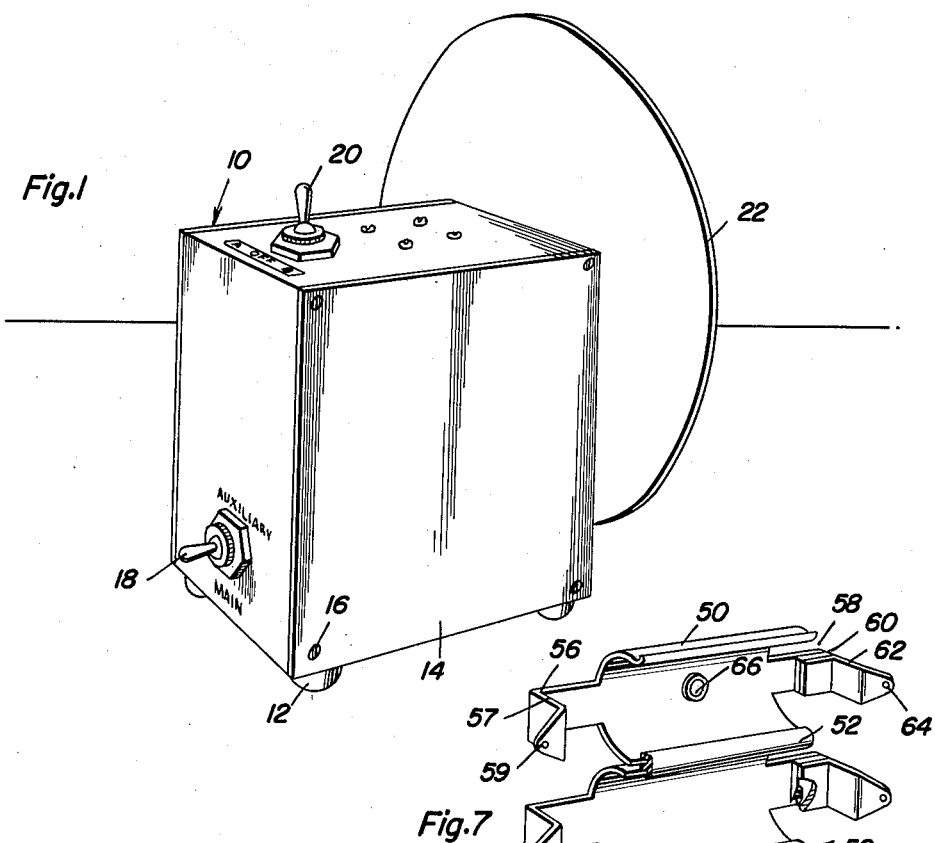
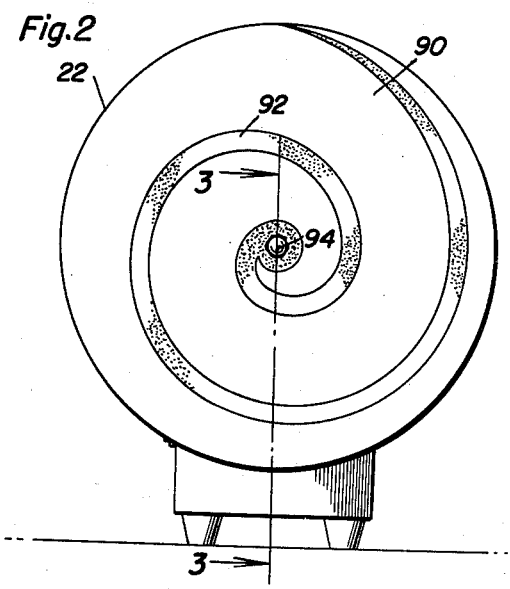
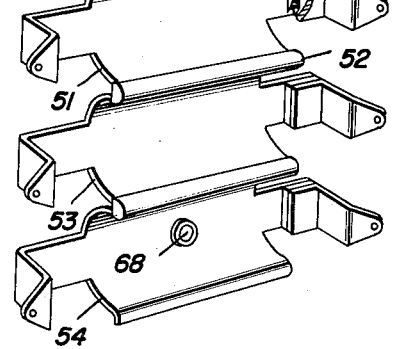
Theodore H. Blau
Robert E. Schaffer
INVENTORS
BY Clarence A. O'Brien
and Harvey B. Jacobson
Attorneys

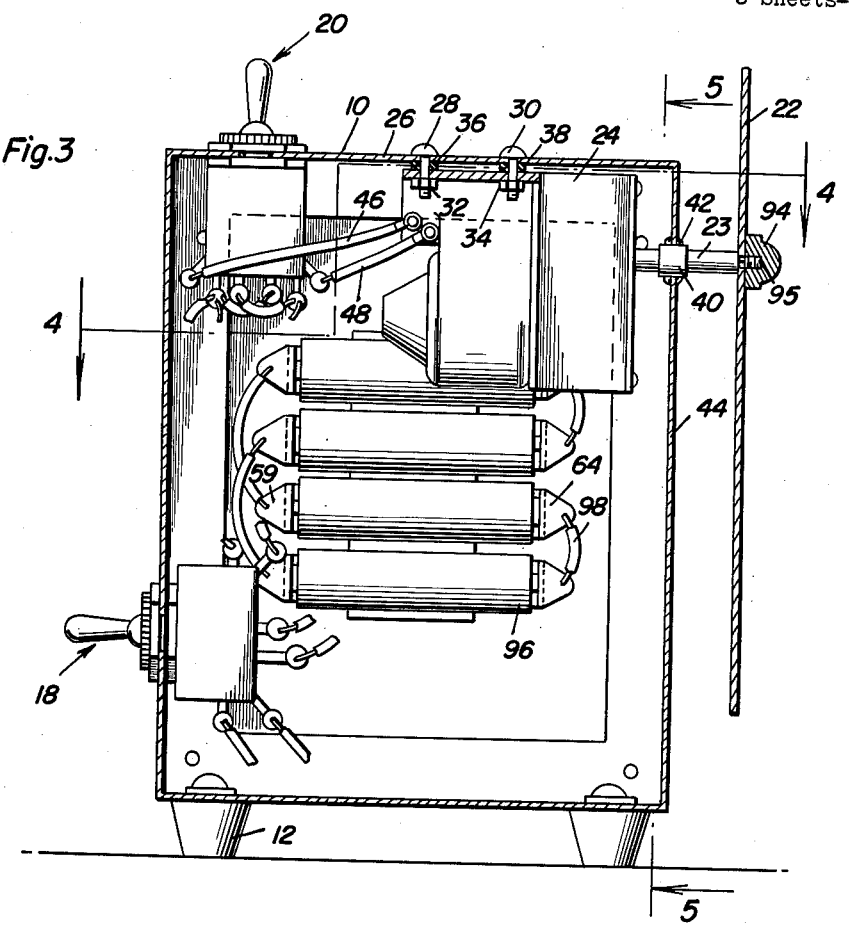
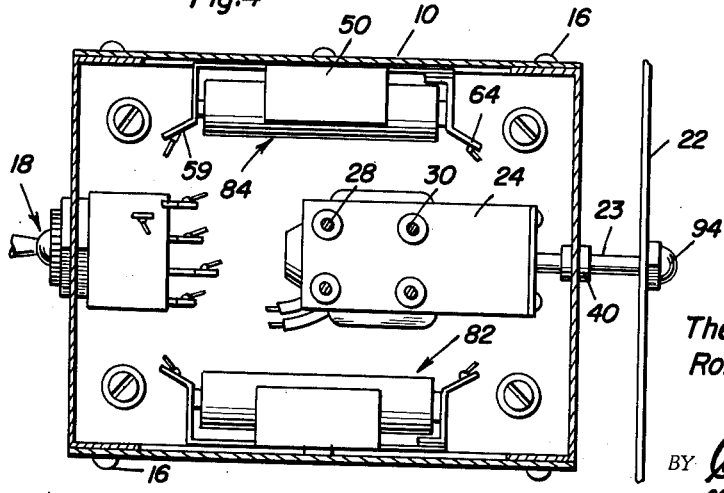
Theodore H. Blau
Robert E. Schaffer
INVENTORS

April 24, 1962 T. H. BLAU ET AL 3,030,944
SPIRAL AFTER-EFFECT APPARATUS
Filed Aug. 28, 1958
3 Sheets-Sheet 3

Theodore H. Blau
Robert E. Schaffer
INVENTORS

BY *Clarence A. O'Brien*
*and Harvey B. Jacobson*
Attorneys

United States Patent Office 3,030,944
Patented Apr. 24, 1962

3,030,944
SPIRAL AFTER-EFFECT APPARATUS
Theodore H. Blau, Tampa, and Robert E. Schaffer, 20 Martinique, Tampa, Fla.; said Blau assignor to said Schaffer
Filed Aug. 28, 1958, Ser. No. 757,857
4 Claims. (Cl. 128—2)

This invention relates generally to a psychological diagnostic device and more particularly to a device utilized to diagnose organic brain damage through the means of the spiral after-effect.

Very recently novel means were suggested for diagnosing organic brain damage by some noted psychologists. They suggested the diagnosis utilize the spiral after-effect. The method primarily involves the utilization of an Archimedes spiral on a disc having approximately a six inch diameter. An Archimedes spiral describes 920° or approximately two and one-half turns about the center of a wheel. The theory of the utilization of this device indicates that when this spiral was rotated at approximately 80 revolutions per minute, a patient would identify the spiral as "going in toward the center." At the end of approximately 30 seconds, the rotation would stop, and if the patient was able to see an "after-effect" or "after-image," the absence of brain damage was indicated. Further, it was found that a more accurate diagnosis could be made if the patient was subjected to a plurality of sets of rotations and particularly sets in different directions. That is, best results are obtained if the Archimedes spiral is initially rotated clockwise four times to get four effects and then rotated counterclockwise four times to get four further effects. A clockwise rotation of the spiral gives a negative after-effect of expansion, while the counterclockwise rotation offers positive after-effect of contraction. Though the basic principles noted above are well known to psychologists, no satisfactory device has been developed for operating the Archimedes spiral conveniently in both directions at a proper speed. In most crude models, unidirectional motors were utilized and two distinct type wheels were employed for giving clockwise and counterclockwise effect. The necessity of constantly changing the wheels after each rotational set requires the consummation of at least ten minutes for each administration of the test. In addition to the difficulty of changing the wheels, the patient was well aware that he could expect a change in the direction of the wheel, thus subjecting the test to some invalidity in that the patient knew something about what was going to happen. Accordingly, a novel spiral after-effect device has been developed which overcomes these disadvantages and eliminates the undesirable invalidity from the tests.

It is therefore the principal object of this invention to provide a novel spiral after-effect device which may be efficiently employed utilizing only one wheel and having a reversible electrical motor for driving the Archimedes spiral.

It is a further object of this invention to provide a novel spiral after-effect device which is relatively simple in construction, inexpensive to manufacture, and easy to operate and repair.

It is more particularly an object of this invention to provide a novel spiral after-effect device which adds validity to the spiral after-effect diagnosis in that the device employs a single wheel for giving both the positive and negative after-effect or after-image without an inconvenient time delay.

It is a still further object of this invention to provide a novel spiral after-effect device which is small, portable, and easily utilized to present the material for the spiral after-effect test.

In accordance with the above stated objects below is particularly described the structure and utilization of the novel spiral after-effect device comprising this invention. The device comprises a housing carrying a reversible direct current electric motor therein having a shaft extending exteriorly of the housing and a disk or wheel having an Archimedes spiral thereon. The center of the spiral is coincident with and fixed to the wheel at the axis of rotation thereof. Two distinct sets of batteries are carried in the housing by aluminum clips and either battery circuit (one, being an auxiliary circuit) may be selectively electrically connected to the electric motor for driving the Archimedes spiral. However, the batteries are connected to the electric motor through a double pole, double throw switch whereby the polarity applied to the motor (either the field or the armature but not both) may be changed for reversing the rotational direction of the motor. The housing, electric motor, electric source, and Archimedes spiral form a compact device which is easily portable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the housing and Archimedes spiral attached thereto;

FIGURE 2 is a front elevational view of the spiral and housing;

FIGURE 3 is a vertical, longitudinal sectional view taken substantially along the plane 3—3 of FIGURE 2;

FIGURE 4 is a horizontal sectional view taken substantially along the plane 4—4 of FIGURE 3;

FIGURE 7 is a perspective view of the battery holding clips; and

Figure 5:
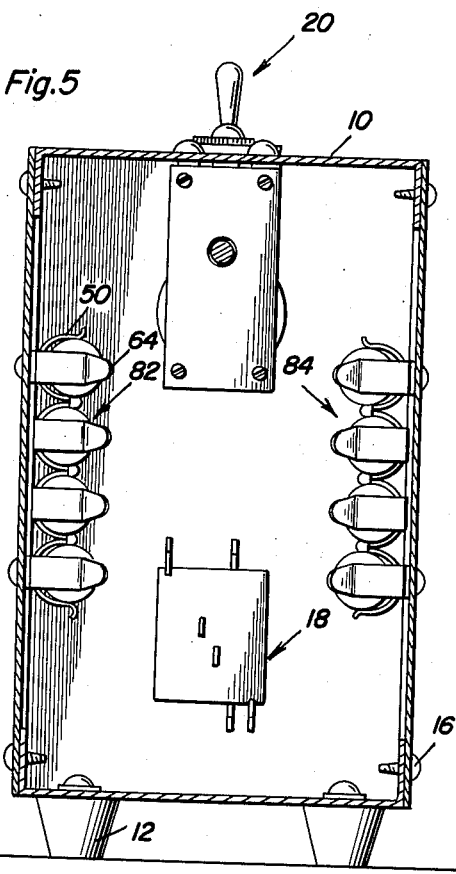
FIGURE 5 is a vertical, transverse sectional view taken substantially along the plane 5—5 of FIGURE 3.
Figure 6:
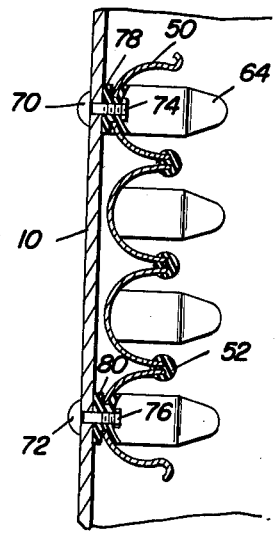
FIGURE 6 is an enlarged sectional view of the battery holding clips.

With continuing reference to the drawings the numeral 10 generally represents the housing containing the elements comprising the working unit having preferably short depending rubber legs 12 and removable panel sides 14 as by screws 16. Exposed exteriorly of the housing is a first switch 18 for electrically connecting the auxiliary or main source to the motor through a double pole, double throw switch 20 which is electrically connected to select the electrical polarity applied to the motor and therefore the direction of rotation. The Archimedes spiral 22 in the form of a wheel or disk is carried by the motor shaft 23.

The housing 10 is preferably a rectangular solid and may be constructed of any material. However, design considerations must include electrical circuit characteristics and rigidity and strength features. A direct current reversible electrical motor 24 is supported from the top surface 26 of the housing 10 by screws 28 and 30 and cooperating nuts 32 and 34. Preferably, insulating washers 36 and 38 are utilized between the motor 24 and the housing 10. A bearing 40 is carried in an aperture 42 in the housing side wall 44 and passes therethrough the motor shaft 23.

Electrically connected to the motor 24 are a pair of electrical leads 46 and 48 which are electrically connected to the movable arm 21 of the double pole, double throw toggle switch 20.

Battery holding clips 50 are mechanically connected but electrically insulated from each other by insulating members 52. The clips are constructed of resilient aluminum and are substantially semi-cylindrical. As is indicated in FIGURE 7 a plurality of clips as 50, 51, 53 and 54 may be connected mechanically together by the electrical insulating members 52. Each of the semi-cylindrical clips has projections as 56 and 58 extending lengthwise of the semi-cylinder. The projection 56 includes a right angular portion 57 and an electrical terminal portion 59. The projection 58 has affixed thereto an insulator block 60 which in turn has fixed thereto a right angular member 62 having an electrical terminal 64. It will be apparent that small batteries as pen light batteries, may be held between the right angular members 57 and 62 with the potential of battery being impressed across the terminals 59 and 64. Further, apertures 66 and 68 are placed in the semi-cylindrical battery holders 50 and 54 for receiving screws 70 and 72 and cooperating nuts 74 and 76 for holding the battery holders adjacent the housing 10. Of course, it is preferable to utilize insulative washers 78 and 80 between the housing 10 and the aluminum holders 66 and 68.

Figure 8:
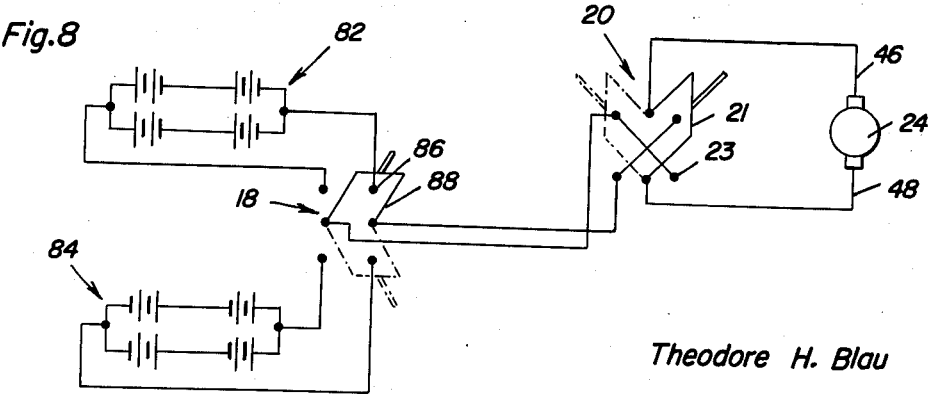
FIGURE 8 is a schematic diagram of the electrical circuit utilized in this invention.

Now particularly referring to FIGURE 5, it is noted that two sets of battery holders 82 and 84 are affixed within the housing 10 on opposed walls. One of these sets constitutes the main electrical source for the electric motor 24 while the second set is utilized as an auxiliary source in case of failure of the first source so as not to invalidate or delay an after-effect test. Each of the battery sets 82, 84 includes four batteries. A preferred embodiment of the invention illustrated in FIGURE 8, shows each of the sets 82 and 84 as including two parallel lines, each line consisting of two serially connected one and one-half volt pen-light batteries. Of course, the electric motor 24 is operable from a three volt source. The batteries, each set, are connected to stationary contacts 86 of the double pole, double throw switch 18. It should be apparent from FIGURE 8, that by the actuation of the movable arm 88 of switch 18, either set of batteries 82 or 84 may be electrically connected to the fixed contacts 23 of switch 20 for actuation of the electrical motor 24. It should be apparent from FIGURE 8 that the switch 18 is utilized only to select the set of batteries 82 or 84 for driving the motor 24 and the switch 20 is utilized for selecting the desired polarity to be impressed upon either the field or armature circuit of the reversible direct current motor 24 for driving the motor in a selected direction.

The Archimedes spiral 22 is most advantageously a six or seven inch lightly colored cardboard wheel 90 having a black spiral 92 printed thereon. The center of the spiral 92 is coincident with the motor shaft 23 with the Archimedes spiral 22 being held on the shaft by an acorn nut 94 which is threadedly engaged with a threaded shaft end 95. The acorn nut 94 falls in the center of the spiral 92. As may be clearly noted in FIGURE 2, the Archimedes spiral 92 extends 920° about the center.

To electrically connect the pen-light batteries 96 in the manner prescribed in the schematic diagram of FIGURE 8, short electrical leads 98 are soldered to the terminals 59 and 64 of the aluminum battery holders.

Also, the terminals 59 and 64 are utilized to electrically connect the electrical power circuit to the double pole, double throw switches 18 and 20.

It is thought that the above explanation adequately recites the specific structural and electrical features of this invention, clearly indicating the validity of the apparatus to one skilled in the art.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A brain damage diagnosing device comprising a housing, a reversible direct current electric motor carried within said housing, a plurality of battery clips supported in said housing, a plurality of batteries carried in said clips, said plurality of batteries electrically connected to form two distinct circuits of opposite polarity, a double pole, double throw switch, said circuits being connected to said switch for alternative energization, said switch connected to said motor whereby said motor may be selectively driven in either direction by said circuits, a shaft on said motor, a spiral member fixedly secured upon said shaft and having a center coincident with said shaft carried thereby, said spiral member extending about its center.

2. The combination of claim 1 wherein said spiral member extends about 920° about its center.

3. A brain damage diagnosing device comprising a housing, a reversible direct current electric motor carried within said housing, direct current electric power means carried exteriorly within said housing, switch means electrically connected to said power means and said motor for energizing said motor in a selected direction, and a spiral member carried externally of said housing and driven by and directly connected to said motor, said motor having a shaft, said spiral member fixedly secured upon said shaft and having a center coincident with said shaft and extending about said center, two sets of dry cell batteries in said housing, circuit means alternatively connecting each set of batteries to said motor for actuating the latter.

4. The combination of claim 3 wherein said circuit means includes a selector switch for selectively connecting one set of said batteries to said motor and a reversing switch interposed between said selector switch and said motor for controlling the direction of rotation of the latter.

References Cited in the file of this patent

UNITED STATES PATENTS

| 2,380,508 | Eaves | July 31, 1945 |
| 2,566,124 | Eaves | Aug. 28, 1951 |
| 2,848,992 | Pigeon | Aug. 26, 1958 |